US012743289B2

(12) United States Patent
Zhu et al.

(10) Patent No.: US 12,743,289 B2
(45) Date of Patent: Sep. 22, 2026

(54) LARGE OBJECT PROCESSING SYSTEM AND LARGE OBJECT PROCESSING METHOD THEREOF

(71) Applicants: DIGIWIN CO., LTD., Shanghai (CN); DATA SYSTEMS CO., LTD., New Taipei City (TW)

(72) Inventors: Qinzhang Zhu, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 411 days.

(21) Appl. No.: 18/464,298

(22) Filed: Sep. 11, 2023

(65) Prior Publication Data

US 2025/0045069 A1 Feb. 6, 2025

(30) Foreign Application Priority Data

Aug. 1, 2023 (CN) ......................... 202310962269.7

(51) Int. Cl.
*G06F 9/448* (2018.01)
*G06F 9/30* (2018.01)

(52) U.S. Cl.
CPC .......... *G06F 9/4488* (2018.02); *G06F 9/3004* (2013.01)

(58) Field of Classification Search
CPC ............................ G06F 9/4488; G06F 9/3004
See application file for complete search history.

(56) References Cited

U.S. PATENT DOCUMENTS 11,868,416 B1 * 1/2024 Dhingra .............. G06F 16/9538

* cited by examiner

*Primary Examiner* — Hau H Hoang
(74) *Attorney, Agent, or Firm* — JCIPRNET

(57) ABSTRACT

The disclosure provides a large object processing system and large object processing method thereof. The large object processing system includes a storage device and a processor. The storage device stores a plurality of large object variable forms, a PV processing module, and a large object processing module. The PV processing module receives a request for processing and further searches for a storage device according to the request to obtain a PV form and a plurality of object values in the PV form. The large object processing module determines whether the plurality of object values include object-referencing character strings. Should the plurality of object values include the object-referencing character strings, the large object processing module obtains corresponding large object data according to the object-referencing character strings. The PV processing module replaces the object-referencing character strings in the PV form with the large object data and organizes the PV form.

18 Claims, 9 Drawing Sheets

910

| User | Activity No. | Maximum threshold (KB) | Runtime length threshold (S) |
| --- | --- | --- | --- |
| tenant_1 | template_a | 1024 | 30 |
| tenant_1 | template_a | 2048 | 5 |
| tenant_1 | template_b | 2048 | 5 |
| tenant_2 | template_c | 100 | 300 |

FIG. 9

LARGE OBJECT PROCESSING SYSTEM AND LARGE OBJECT PROCESSING METHOD THEREOF

CROSS-REFERENCE TO RELATED APPLICATION

This application claims the priority benefit of China application serial no. 202310962269.7, filed on Aug. 1, 2023. The entirety of the above-mentioned patent application is hereby incorporated by reference herein and made a part of this specification.

BACKGROUND

Technical Field

The disclosure relates to data processing technology, specifically to a large object processing system and large object processing method thereof.

Description of Related Art

Generally speaking, execution of task data involves performing a plurality of processes in succession while each process is composed of a plurality of activities. The present activity adopts process variables (PVs) generated from the previous activity. Likewise, the present activity generates new PVs for the subsequent activity. To isolate PVs generated from separate activities, each activity stores variables of the present activity, i.e., PVs in the context. However, respectively storing PVs generated from each activity occupies plenty of storage space. Moreover, the present activity requires certain value (data) from process variable (PV) form and loads all content of the PVs into a computer unit. Consequently, much of internal storage originally available for runtime is occupied or becomes insufficient, resulting in computer rebooting.

SUMMARY

The disclosure is directed to a large object processing system and method for processing large object in order to effectively enhance storing process and reading process of large object data in activity data.

Embodiments of the disclosure exemplifies that the large object processing system herein includes a storage device and a processor. The storage device stores a plurality of large object variable forms, a PV processing module, and a large object processing module. The processor, coupled to storage devices, executes PV processing module and large object processing module. The PV processing module receives a request for processing and further searches for storage device according to the request to fetch a PV form and a plurality of object values in the PV form. The large object processing module determines whether the plurality of object values include object-referencing character strings. For the plurality of object values that include the object-referencing character strings, the large object processing module fetches corresponding large object data according to the object-referencing character strings. PV processing module replaces the object-referencing character strings in the PV form with large object data and organizes the PV form.

According to the embodiments of the disclosure, the large object processing method herein includes the following steps: PV processing module receiving request for processing and obtaining a PV form and a plurality of object values in the PV form by searching for a storage device; large object processing module determining whether the plurality of object values include object-referencing character strings; for the plurality of object values that include the object-referencing character strings, the large object processing module obtaining corresponding large object data in accordance with the object-referencing character strings; the PV processing module replacing the object-referencing character strings in the PV form with the large object data and organizing the PV form.

In light of the above, the large object processing system and large object processing method thereof of the disclosure efficiently store large objects in activity variable forms and conduct replacements with the object-referencing character strings to further improve utilization of storage space and internal storage.

To explicitly elaborate on the aforementioned features and advantages of the disclosure, embodiments of the disclosure are provided below with relevant drawings for detailed description.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 9 is an exemplary comparison table of large object threshold, delineating an embodiment of the disclosure.

DESCRIPTION OF THE EMBODIMENTS

Figure 1:
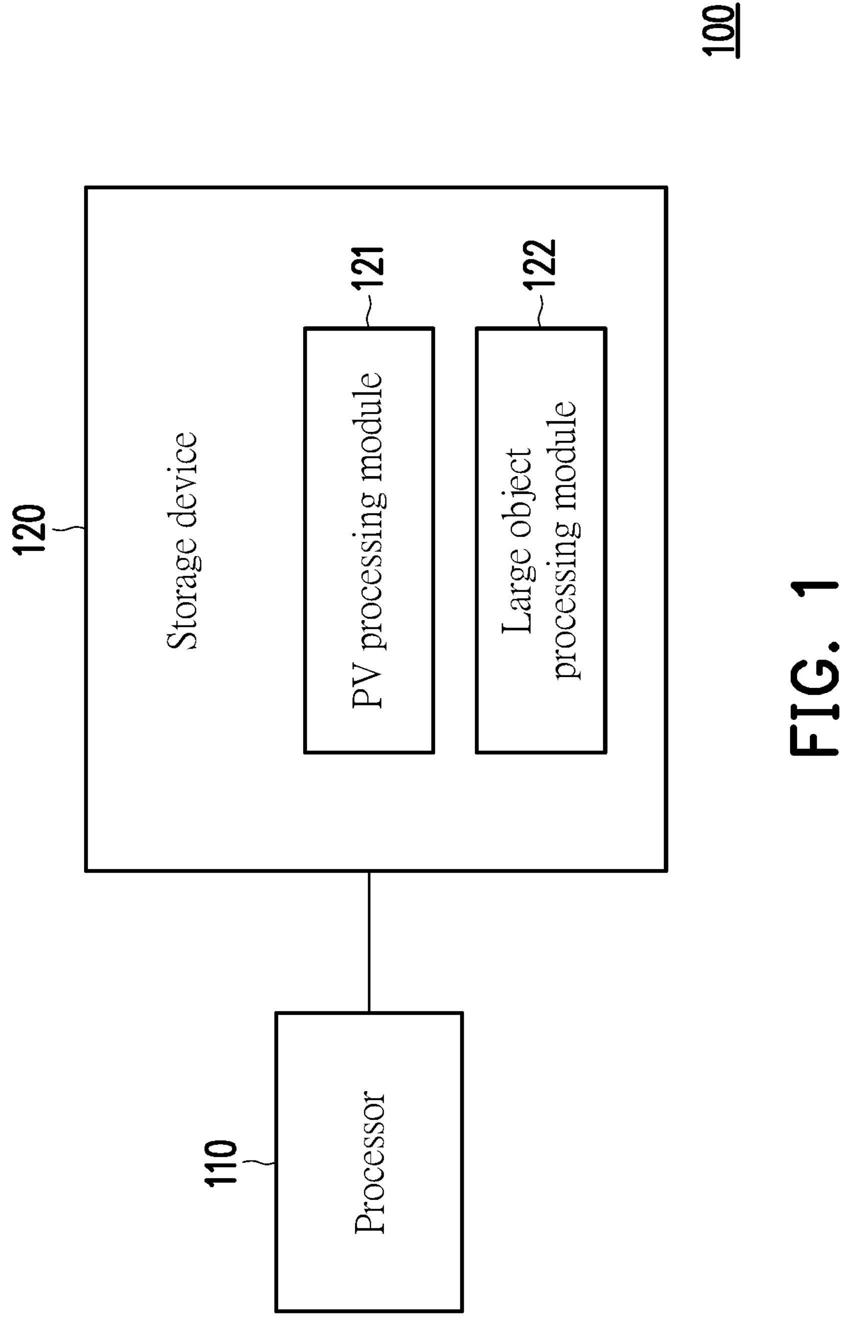
FIG. 1 is a schematic diagram of large object processing system, delineating an embodiment of the disclosure.

Below are elaborations on the exemplary embodiments of the disclosure, which are also duly illustrated in their relevant drawings. As long as it is probable, identical elements/characters in the drawings or descriptions herein refer to identical or similar parts.

FIG. 1 is a schematic diagram of large object processing system, delineating an embodiment of the disclosure. As shown in FIG. 1, large object processing system 100 includes processor 110 and storage device 120. Processor 110 is coupled to storage device 120. Large object processing system 100 may further includes communication interface or data transmission interface that is equipped with actual electronic circuit components to enable processor 110 to communicate or transmit data with an external business process system, a task execution system, database, or a server. In this embodiment, large object processing system 100 and a database are respectively exemplified in a cloud server or an on-premise private server. The database is incorporated into Enterprise Resource Planning (ERP) and executes a plurality of Application Programming Interfaces (API) to manipulate/call PV processing module 121 and large object processing module 122. In an embodiment, external business process system refers to a system that executes data of processes, tasks, and activities; for example, a program that generates purchase orders according to activity data, i.e., by executing purchase operation data, or a program that generates requisition forms according to requisition task data, i.e., by executing requisition data. The disclosure does not restrict the scope of the external business process system.

In this embodiment, processor 110, the processor of large object processing system 100, may include Central Processing Unit (CPU), other programmable Microprocessor that serves common or special purpose(s), Digital Signal Processor (DSP), Application Specific Integrated Circuits (ASIC), Programmable Logic Device (PLD), processing circuit or combinations of the previously mentioned devices.

Storage device 120 may be remote cloud storage service or local data storage service. Storage device 120 includes Memory and/or database, while the database may be Non-Volatile Memory (NVM). By storing relevant programs, modules, systems, or algorithms that serve to exemplify the embodiments, storage device 120 provides processor 110 with access and enables the processor to execute related functions and operations described in each embodiment of the disclosure. In memory cache, storage device 120 stores PV forms, variable data, large object thresholds, large object threshold comparison tables, and runtime of the tasks and activities described in each embodiment of the disclosure. Moreover, the PV forms described in the embodiments of the disclosure refer to variable data generated from the previous/next process (context). For each activity, variable data in PV form that an activity corresponds to are fetched by capturing the process variables in context (the previous and next processes) at the exact moment the present activity is being executed. The variable data are not affected by subsequent process execution and hence absolute isolation is achieved.

Figure 2:
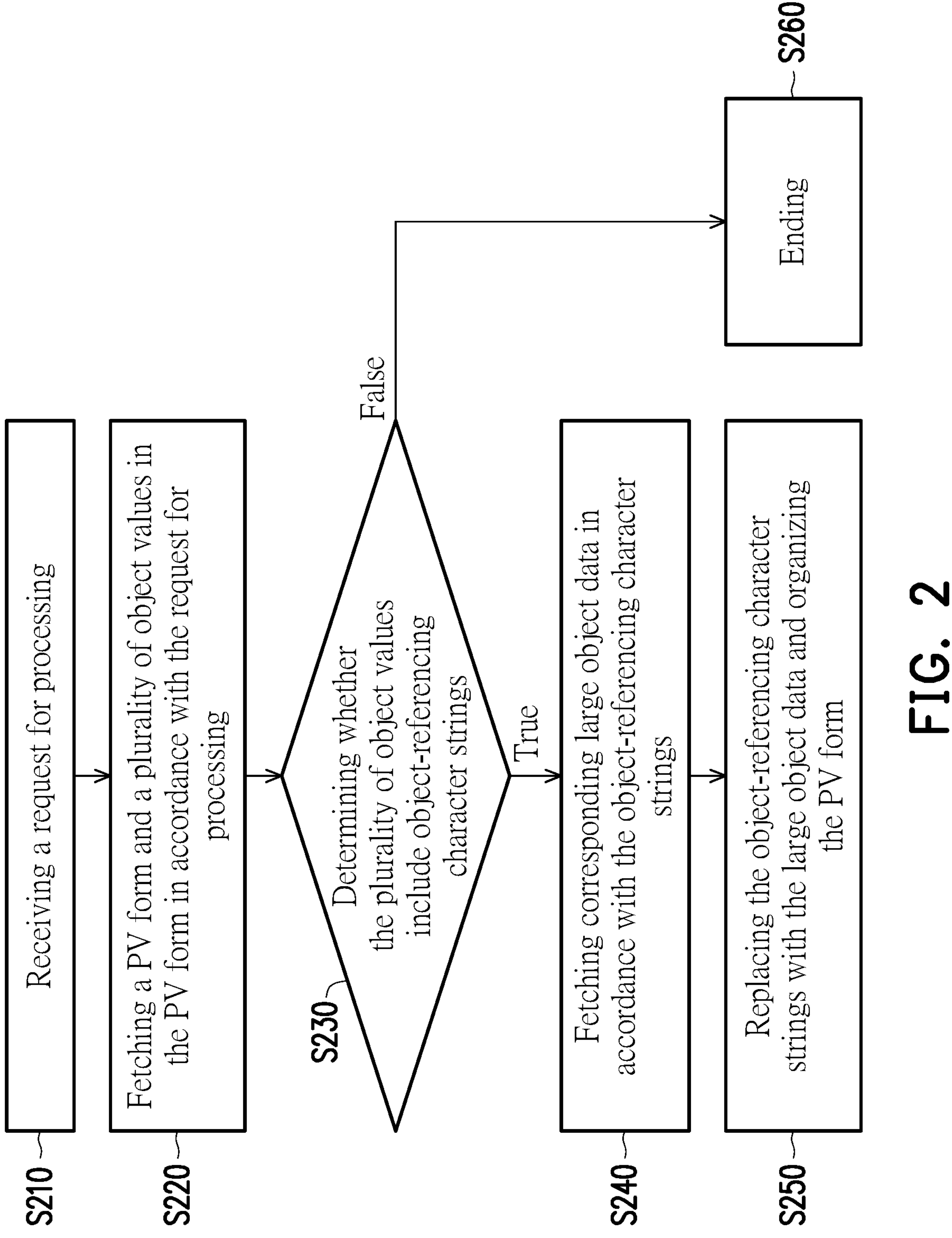
FIG. 2 is a flowchart of large object processing method, delineating an embodiment of the disclosure.
Figure 3:
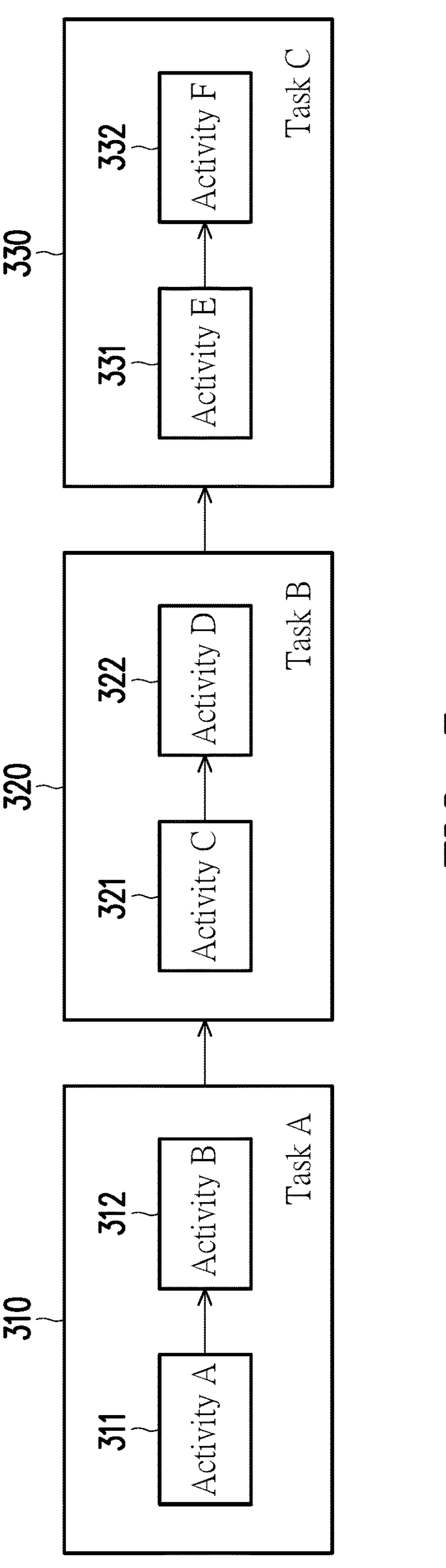
FIG. 3 is a schematic diagram of how to execute tasks and activities, delineating an embodiment of the disclosure.

FIG. 2 is a flowchart of large object processing method, delineating an embodiment of the disclosure. FIG. 3 is a schematic diagram of how to execute tasks and activities, delineating an embodiment of the disclosure. Reference to FIG. 1 and FIG. 2 suggests that storage device 120 stores PV processing module 121 and large object processing module 122. PV processing module 121 and large object processing module 122 may be exemplified in JSON (JavaScript Object Notation), Extensible Markup Language (XML), YAML, other programming languages, etc. The disclosure does not restrict the scope of such processing module and large object processing module.

Specifically, PV processing module 121 receives either a request for processing or a request for storing from an external process execution system. In accordance with the request, PV processing module 121 fetches corresponding PV form and reads variable values or object values in the PV form. Large object processing module 122 determines whether object values in the PV form include object-referencing character strings before obtaining corresponding storage block according to the object-referencing character strings. The storage block may be implemented in storage device 120 of large object processing system 100 or be implemented in an external database.

FIG. 3 is a schematic diagram of how to execute tasks and activities, delineating an embodiment of the disclosure. FIG. 3 indicates that during execution of process or task process, task A310, task B320, task AND C330 are executed in sequence, as task A310 includes activity A311 and activity B312. Task B320 includes activity C321 and activity D322 while task C330 includes activity E331 and activity F332. Such tasks may be assignment tasks, script tasks, data integration tasks, data quality inspection tasks, or data-fetching tasks. The activities refer to detailed operations of task execution. For example, logic operations such as data management activity, data-fetching activity, or data matching activity. Note that process variables in process context are used while the present activity is being executed and new process variables are generated for use in the subsequent activities. Therefore, for each activity, process variables generated from the previous and the next activities must be logged to further generate an independent PV form for absolute isolation. In other words, as a process processing system or an external process execution device runs a process or an activity, the system or the device issues a request for processing to large object processing system 100 in order to fetch a PV form of the present activity and also to confirm whether PV forms of the present process include large objects before loading required large objects.

Refer to FIG. 1 to FIG. 3. Large object processing system 100 runs steps S210~S270, as indicated below. In step S210, PV processing module 121 receives a request for processing. Specifically, while running an activity, a processor or an external process execution server issues a request for processing to PV processing module 121 in order to fetch a PV form and variable values (process variables) of the present activity. In step S220, PV processing module 121 searches for storage device 120 or an external database in accordance with the request for processing to fetch the PV form and the plurality of object values in the PV form in correspondence to the request for processing. In particular, in accordance with activity information in the request for processing, e.g., activity B312, and according to the activity information, PV processing module 121 calls up the PV form that corresponds to activity B312 from storage device 120 or the external database. The PV form includes a plurality of object values.

In step S230, large object processing module 122 determines whether the plurality of object values include the object-referencing character strings. In this embodiment, object values may be variable values or object-referencing character strings. For example, variable values may be variable data, such as “Object 1”, “Object 2”, etc. The object-referencing character strings may be marked as “ref-Object 1”, “ref-Object 2”, etc.

In step S240, large object processing module 122 fetches corresponding large object data from storage device 120 or the external database according to the object-referencing character strings. Specifically, storage device 120 or the database stores a plurality of large object data, i.e., data that require threshold-exceeded storage space, while the object-referencing character strings function as unique identifiers in searching for corresponding large object data. Therefore, from storage device 120 or the database, large object processing module 122 fetches the large object data that correspond to the object-referencing character strings.

In step S250, the PV processing module replaces the object-referencing character strings in the PV form with the large object data and organizes the PV form. Specifically, PV organizing unit of PV processing module 121 replaces the object-referencing character strings in the PV form with the large object data and also organizes the PV form. Organizing the PV form refers to loading and restoring object data or large object data required by the present activity.

In step S270, corresponding to a plurality of object values that do not include object-referencing character strings, large object processing module 122 ends the process. For example, large object processing module 122 ends the process after determining that the PV form does not include the object-referencing character strings. In another embodiment, after each object-referencing character string in the PV form is restored to its corresponding large object datum, PV processing module 121 outputs the organized PVs to a terminal device that corresponds to the request for processing, e.g., an electronic device, and ends the process. Hence, large object processing system 100 substantially reduces storage space required by the PV form since such PV form is designed to include object-referencing character strings. Moreover, in accordance with settings of large object thresholds, additional storage of large object data is realized to enhance storage space utilization rate.

Figure 4:
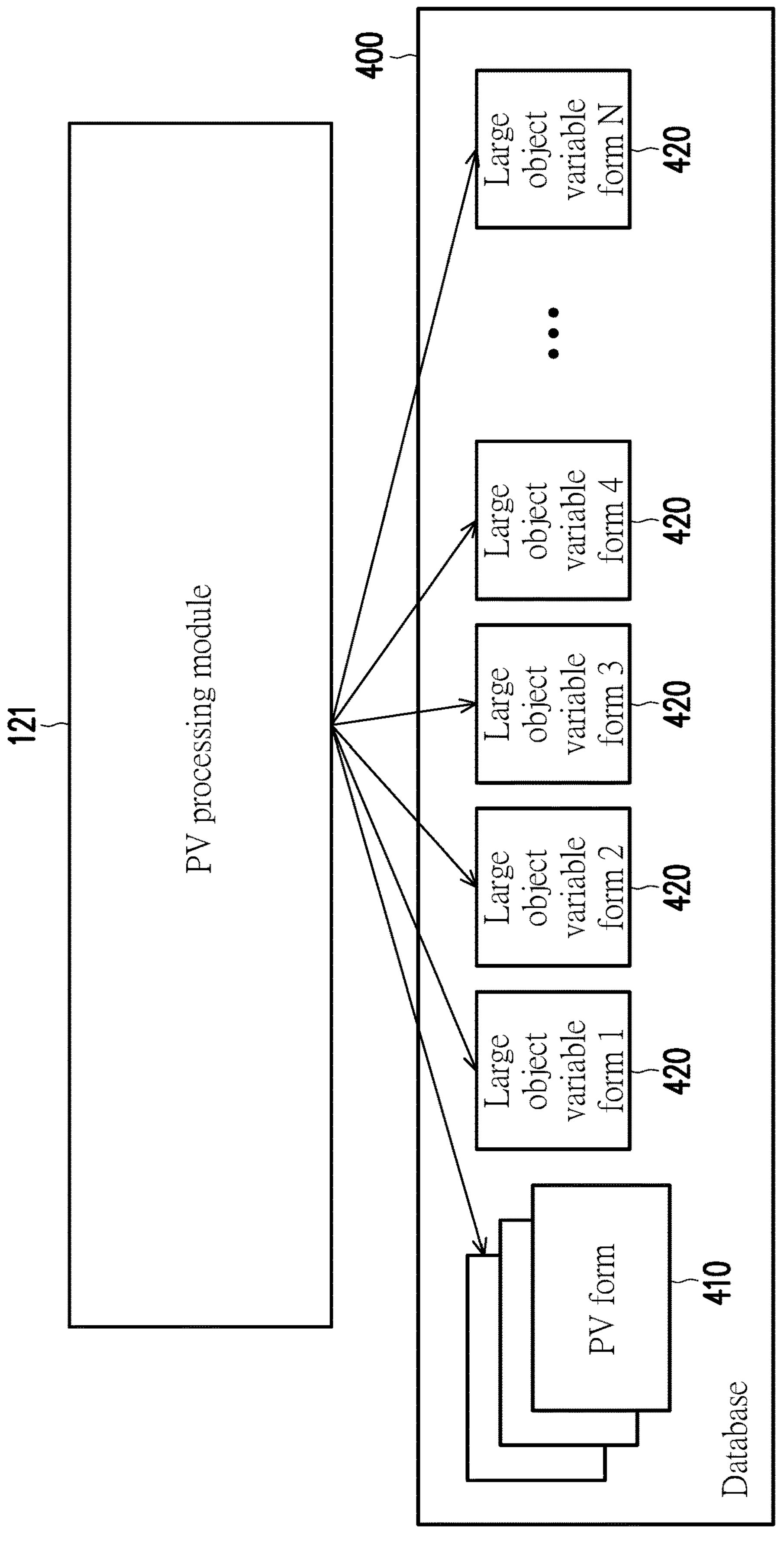
FIG. 4 is a schematic diagram of PV processing module and database, delineating an embodiment of the disclosure.
Figure 5:
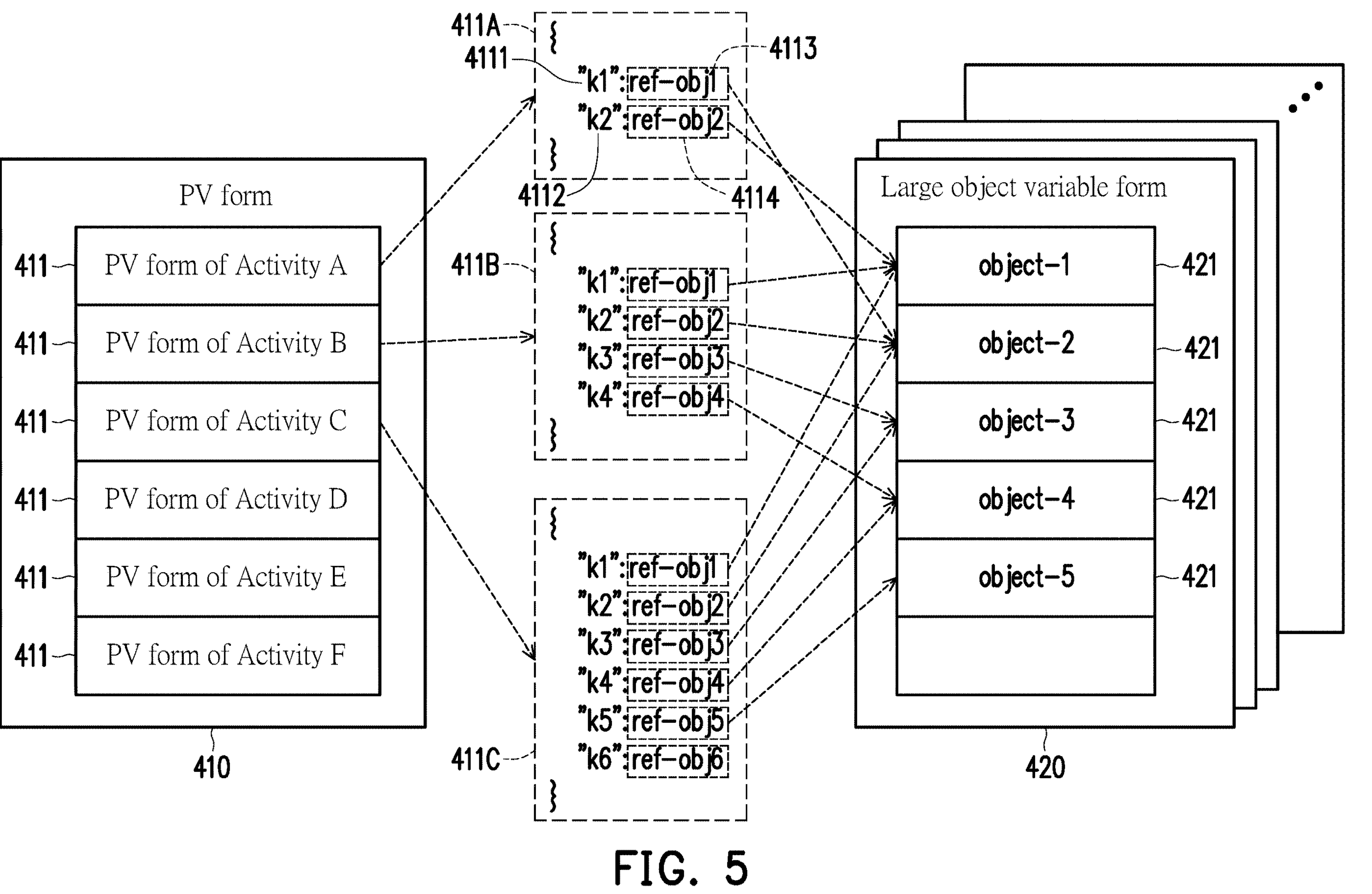
FIG. 5 is an interrelationship diagram of PV forms and large object forms, delineating an embodiment of the disclosure.

FIG. 4 is a schematic diagram of PV processing module and database, delineating an embodiment of the disclosure. FIG. 5 is an interrelationship diagram of PV forms and large object forms, delineating an embodiment of the disclosure. After organizing PV form 410, PV processing module 121 fetches corresponding dataset from PV form 410, i.e., restored/loaded data. Subsequently, PV processing module 121 outputs dataset required by the present activity.

Refer to FIG. 4 and FIG. 5. Database 400 stores a plurality of PV forms 410 and a plurality of large object variable forms 420. Each activity corresponds to an activity-specific PV form (411A, 411B, or 411C). The PV forms (411A, 411B, and 411C) include a plurality of variable values and a plurality of variable names. Furthermore, each variable name corresponds to one of the variable values, and each object value is a variable value or an object-referencing character string. Specifically, each PV form (411A, 411B, or 411C) includes multiple pairs of variable names and variable values. For example, PV variable form 411A of activity A includes variable name k14111 and variable name k24112. Moreover, variable name k14111 corresponds to object 1—referencing character string 4113, while variable name k24112 corresponds to object 2—referencing character string 4114. As FIG. 5 illustrates, large object processing module 122 fetches corresponding large object variable form 420 from a plurality of large object variable forms 420 in accordance with the object-referencing character strings before calling up corresponding large object data 421. Note that large object processing module 122 includes a data router, which establishes the plurality of large object variable forms 420 in accordance with processing time or numbering value. In an embodiment, the data router is intended to call up corresponding large object data 421 in accordance with object-referencing character strings.

Figure 6:
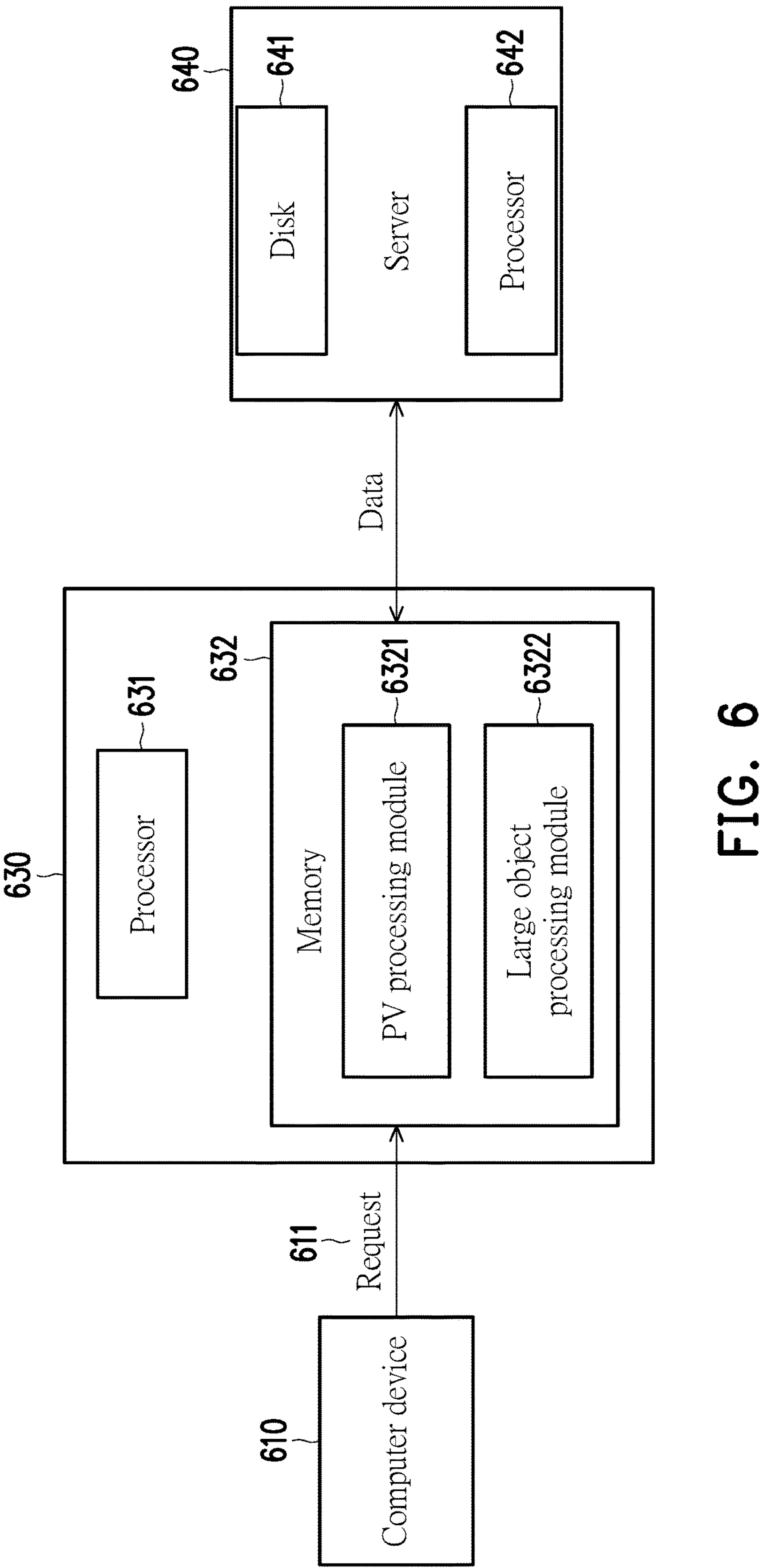
FIG. 6 is a schematic diagram of large object processing system, computer device, and server, delineating an embodiment of the disclosure.
Figure 7:
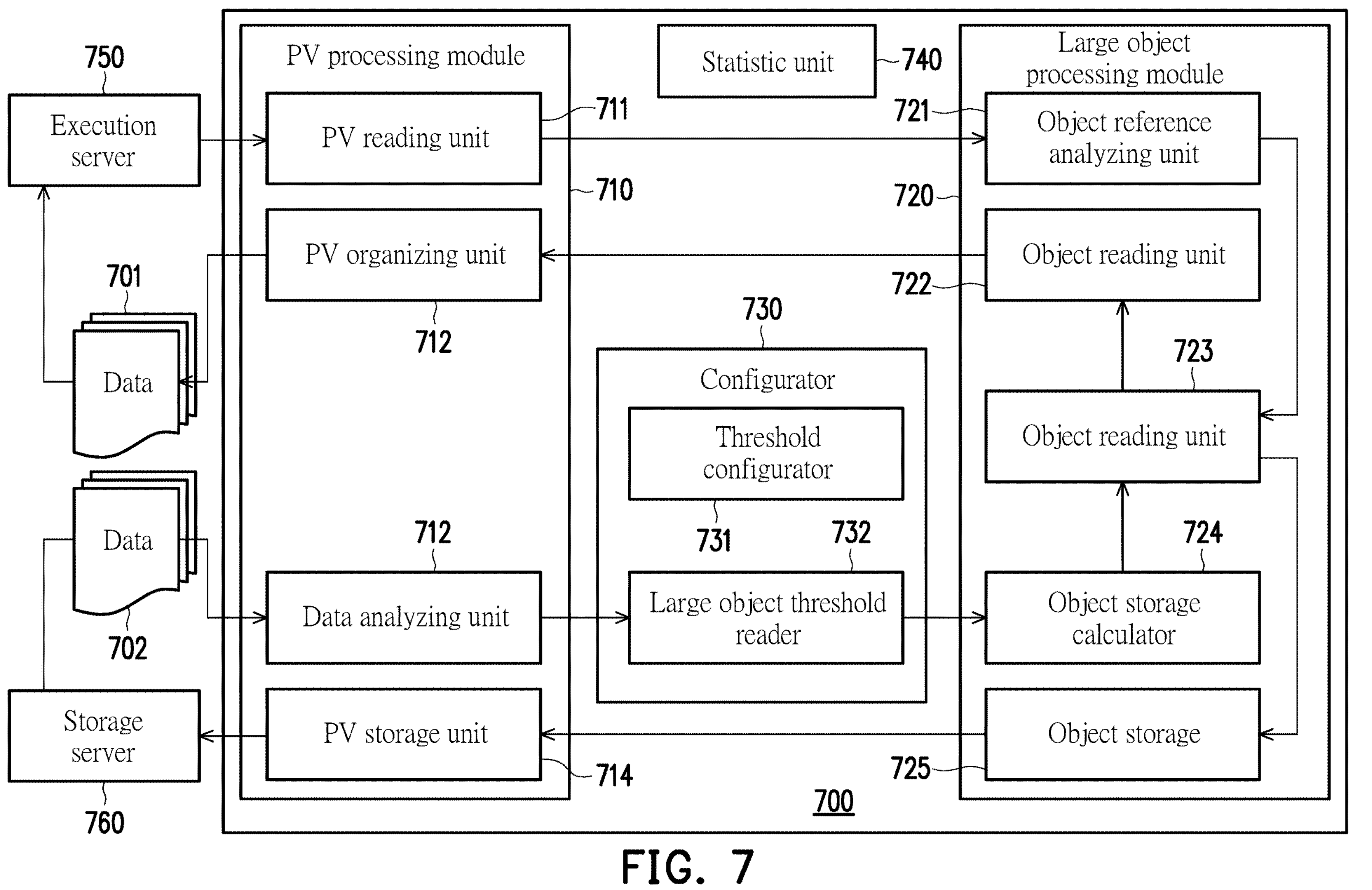
FIG. 7 is a schematic program of execution server, storage server, and large object processing system, delineating an embodiment of the disclosure.

FIG. 6 is a schematic diagram of large object processing system, computer device, and server, delineating an embodiment of the disclosure. FIG. 7 is a schematic program of execution server, storage server, and large object processing system, delineating an embodiment of the disclosure. As shown in FIG. 6, large object processing system 630 is communicatively connected to computer device 610 and server 640. Large object processing system 630 includes processor 631 and internal storage 632. Server 640 includes disk 641 and processor 642. Computer device 610 sends request for processing 611 to large object processing system 630 while executing any of the activities therein. Processor 631 of large object processing system 630 executes PV processing module 6321 and large object processing module 6322 in order to fetch corresponding large object data from external server 640 in accordance with request for processing 611. Subsequently, large object processing system 630 returns required data that correspond to request for processing 611 back to computer device 610.

As shown in FIG. 7, large object processing system 700 includes configurator 730 and statistic unit 740. PV processing module 710 includes PV reading unit 711, PV organizing unit 712, data analyzing unit 713, and PV storage unit 714. Configurator 730 includes threshold configurator 731 and large object threshold reader 732. Large object processing module 720 includes object reference analyzing unit 721, object reading unit 722, data router 723, object storage calculator 724, and object storage 725. In this embodiment, large object processing system 700 is communicatively connected to execution server 750 and storage server 760. Furthermore, data 701 (e.g., a request for processing) and data 702 (e.g., a request for storing) are received by execution server 750 and storage server 760, respectively.

Figure 8:
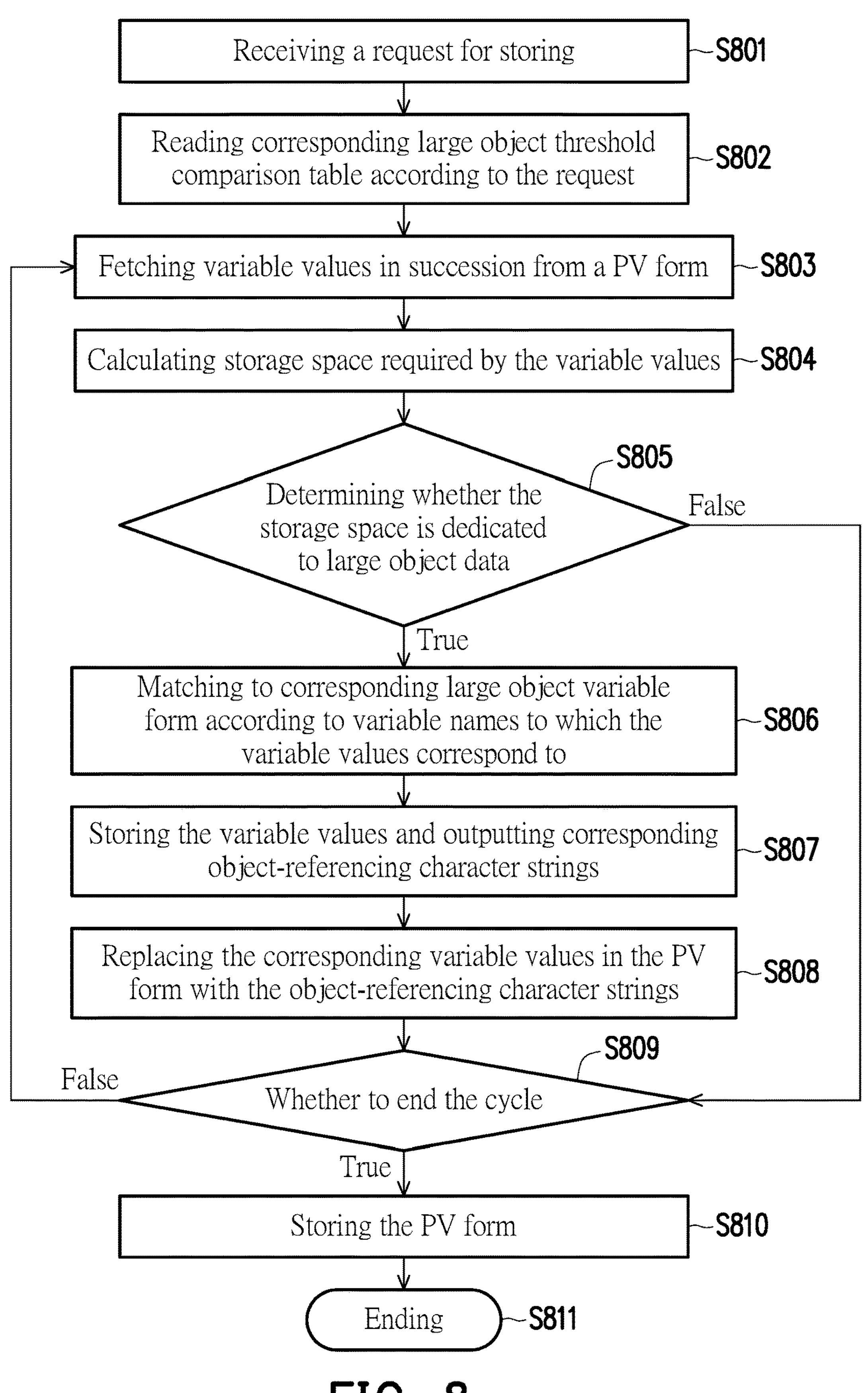
FIG. 8 is a storage flowchart of large object processing method, delineating an embodiment of the disclosure.

FIG. 8 is a storage flowchart of large object processing method, delineating an embodiment of the disclosure. FIG. 9 is an exemplary comparison table of large object threshold, delineating an embodiment of the disclosure. Storing process refers to storing large object data from an original PV form into a storage device or a database and replacing stored large object data with object-referencing character strings in order to substantially reduce storage space required by the PV form. In other words, large object processing system 700 boosts storage space utilization rate through additional storage of large object data and establishment of a plurality of large object variable forms. Large object processing system 700 runs steps S801~S811. In step S801, PV processing module 710 receives a request for processing, e.g., data 702, through data analyzing unit 713. Besides, the request for storing corresponds to certain PV form. Specifically, the request for storing may be a request for storing of any activity and the PV form of the activity is deemed as included. In step S802, in accordance with the request for storing, from storage device 120 or a database, large object threshold reader 732 of configurator 730 reads large object threshold comparison table 910 that corresponds to the request for storing. Specifically, large object threshold comparison table 910 includes a plurality of predetermined maximum thresholds, and each threshold corresponds to certain user number and activity number. Hence, large object threshold reader 732 fetches large object threshold comparison table 910 that corresponds to the request for storing according to user number and activity execution to which the request for storing corresponds.

In step S803, data analyzing unit 713 fetches a plurality of variable values in succession from the PV form that corresponds to the request for storing. In step S804, object storage calculator 724 calculates storage space required by the variable values. In step S805, in accordance with large object threshold comparison table 910, data analyzing unit 713 determines whether required storage space is dedicated to large object data. For example, large object threshold comparison table 910 indicates that the present activity corresponds to maximum threshold 1024. As one of the present activities requires 512 KB storage space, data analyzing unit 713 determines that the storage space is not dedicated to large object data. Alternatively, as one of the present activities requires 2048 KB storage space, data analyzing unit 713 determines that the storage space is dedicated to large object data.

In step S806, since required storage space is dedicated to large object data, data router 723 matches to one of the large object variable forms in accordance with variable names to which the variable values correspond. In other words, data router 723 calls up the corresponding large object variable form according to the variable names. In step S807, object storage 725 stores variable values and outputs corresponding object-referencing character strings to PV storage unit 714.

In step S808, PV storage unit 714 replaces corresponding variable values in the PV form with the object-referencing character strings. In step S809, data analyzing unit 713 determines that each variable value in the PV form has been determined, i.e., determining whether to end each variable value cycle. In step S810, after data analyzing unit 713 finishes determining each variable value in the PV form, PV storage unit 714 stores the PV form.

In an embodiment, each request for processing corresponds to certain activity execution and data requirement list. The data requirement list provides variable values required in executing the present activity. Large object processing module 720 determines whether a plurality of object values include the object-referencing character strings and also determines that whether the object-referencing character strings conform to the data requirement list. In other words, object-referencing character strings not conforming to the data requirement list resulted in large object processing module 720 not restoring corresponding large object data in order to reduce storage space required by restored dataset. In correspondence to the plurality of object values that include the object-referencing character strings, and by conforming to the data requirement list, PV processing module 710 replaces the object-referencing character strings that conform to the list with the large object data.

In an embodiment, statistic unit 740 records a median of historic runtime, which may be a median of activity runtime on the previous work day or any day. Besides, statistic unit 740 outputs the median of historic runtime to threshold configurator 731. Threshold configurator 731 matches the median of historic runtime to one of the large object thresholds in accordance with the length of time. Threshold configurator 731 adds a plurality of runtime lengths and large object thresholds into large object threshold comparison table 910 in accordance with the median of historic runtime to adjust the table. In an embodiment, a plurality of large object thresholds in large object threshold comparison table has been predetermined, i.e., predetermined maximum thresholds 512 KB, 1024 KB, and 2048 KB, respectively. For example, corresponding to user number 1 ("tenant_1" in FIG. 9) and activity number ("template_a" in FIG. 9), median of activity runtime on the previous work day is 50-second. Consequently, threshold configurator 731 adds length of time threshold 50 and maximum threshold 512 into large object threshold comparison table 910 to adjust large object threshold comparison table 910.

Hence, data analyzing unit 713 fetches corresponding thresholds from the large object threshold comparison table in accordance with PV runtime. Specifically, threshold configurator 731 matches a plurality of runtime lengths and a plurality of large object thresholds in large object threshold comparison table 910 in accordance with their sizes. The plurality of runtime lengths and the plurality of large object thresholds are negatively correlated and such correlation is displayed in the large object threshold comparison table where they are arranged and matched accordingly. For example, in large object threshold comparison table 910, maximum threshold 1024 corresponds to length of time threshold 30, while maximum threshold 2048 corresponds to length of time threshold 5. Specifically, for an activity of shorter runtime, since shorter length of time enables the activity to occupy internal space for a shorter period, larger large object threshold is allowed to reduce redundant storing and restoring. However, for an activity of longer runtime, since the activity being executed occupies internal space for a longer period, setting a lower large object threshold and restoring only the variable values (e.g., data) required by the present activity save more storage space.

As stated above, large object processing system and large object processing method thereof of the disclosure substantially reduce storage space required by a PV form since such PV form is designed to include object-referencing character strings. Moreover, in accordance with settings of large object thresholds, additional storage of large object data is realized to avoid repeating a plurality of large object data in various PV forms. Thus, the large object processing system and the large object processing method thereof improve storage space utilization rate. Since large object processing system restores only the data required by the present activity, utilization of internal storage space is reduced and processing efficiency is enhanced.

Finally, the previously mentioned embodiments solely illustrate technical solutions of the disclosure instead of restricting the disclosure. Despite detailed descriptions provided in the embodiments, it is obvious to a person of ordinary skill in the art that the technical solutions in the embodiments may still be modified and technical features therein may be partially or entirely replaced by their counterparts. The modifications or replacements do not cause the technical solutions that undergo modifying or replacing to depart from their essential characteristics in each embodiment of the disclosure.

What is claimed is:

1. A large object processing system, comprising:

a storage device, storing a plurality of large object variable forms, a process variable (PV) processing module, and a large object processing module, wherein the PV processing module comprises a data analyzing unit and a PV storage unit, wherein the large object processing module comprises a data router, an object storage calculator, and an object storage;

a processor, coupled to the storage device, executing the PV processing module and the large object processing module;

a configurator;

wherein the PV processing module receives a request for processing and obtains a PV form and a plurality of object values in the PV form according to the request for processing;

wherein the large object processing module determines whether the plurality of object values comprise object-referencing character strings;

wherein in response to the plurality of object values that comprise the object-referencing character strings, the large object processing module obtains large object data, which is corresponding to the object-referencing character strings, according to the object-referencing character strings;

wherein the PV processing module replaces the object-referencing character strings in the PV form with the large object data and organizes the PV form;

wherein the data analyzing unit receives a request for storing, which corresponds to the PV form;

wherein in accordance with the request for storing, a large object threshold reader of the configurator reads a corresponding large object threshold comparison table from the storage device;

wherein the data analyzing unit obtains variable values in succession from the PV form in correspondence to the request for storing;

wherein the object storage calculator calculates a storage space required by the variable values;

wherein the data analyzing unit determines whether the required storage space is dedicated to the large object data in accordance with the large object threshold comparison table;

in response to the storage space required by the variable values being dedicated to the large object data, the data router matching to one of the large object variable forms in accordance with variable names to which the variable values correspond;

wherein the object storage stores the variable values and outputs the corresponding object-referencing character strings to the PV storage unit; and wherein the PV storage unit replaces the corresponding variable values in the PV form with the object-referencing character strings.

2. The large object processing system according to claim 1, wherein the PV processing module organizes the PV form before obtaining corresponding dataset in the PV form; and the PV processing module outputting the dataset.

3. The large object processing system according to claim 1, wherein the data analyzing unit determines each of the variable values in the PV form before the PV storage unit storing the PV form.

4. The large object processing system according to claim 1, wherein the PV form comprises the plurality of variable values and the plurality of variable names; wherein each of the variable names corresponds to one of the variable values; wherein each of the object values is one of the variable value and the object-referencing character string.

5. The large object processing system according to claim 1, wherein the data router establishes the plurality of large object variable forms in accordance with one of a processing time and a numbering value; and wherein each of the variable names matches to one of the plurality of large object variable forms via one of Hash function calculating and the numbering value.

6. The large object processing system according to claim 1, wherein a threshold configurator matches a plurality of runtime lengths and a plurality of large object thresholds in the large object threshold comparison table in accordance with their sizes; wherein the plurality of runtime lengths and the plurality of large object thresholds are negatively correlated and such correlation is displayed in the large object threshold comparison table where they are arranged and matched accordingly; and wherein the large object threshold reader obtains the large object threshold comparison table that corresponds to the request for storing according to a user number and an activity execution to which the request for storing corresponds.

7. The large object processing system according to claim 1, wherein the request for processing corresponds to an activity execution and a data requirement list;

wherein the large object processing module determines whether the plurality of object values comprise object-referencing character strings and whether the object-referencing character strings conform to the data requirement list; and wherein in response to the plurality of object values that comprise the object-referencing character strings, which conform to the data requirement list, the PV processing module replaces the object-referencing character strings that conform to the data requirement list with the large object data.

8. The large object processing system according to claim 7, wherein the configurator comprises a threshold configurator; wherein the threshold configurator correspondingly matches a median of a historic runtime to one of the large object thresholds in accordance with a length of time; wherein the threshold configurator adds the plurality of runtime lengths and the plurality of large object thresholds into the large object threshold comparison table in accordance with the median of the historic runtime to adjust the large object threshold comparison table; and wherein the data analyzing unit obtains corresponding thresholds from the large object threshold comparison table in accordance with a PV runtime.

9. The large object processing system according to claim 8, further comprising a statistic unit which records the median of the historic runtime and outputs the median of the historic runtime to the threshold configurator.

10. A large object processing method, comprising:

receiving a request for processing by a PV processing module; the PV processing module further searching for a storage device according to a request to obtain a PV form and a plurality of object values in the PV form;

determining whether the plurality of object values comprise object-referencing character strings by a large object processing module;

in response to the plurality of object values that comprise the object-referencing character strings, obtaining corresponding large object data according to the object-referencing character strings by the large object processing module;

replacing the object-referencing character strings in the PV form with the large object data by the PV processing module and organizing the PV form;

receiving a request for storing which corresponds to the PV form by a data analyzing unit;

reading a corresponding large object threshold comparison table from the storage device by a large object threshold reader of a configurator;

obtaining variable values in succession from the PV form in correspondence to the request for storing by the data analyzing unit;

calculating, an object storage calculator, a storage space required by the variable values;

determining whether the required storage space is dedicated to large object data by the data analyzing unit in accordance with the large object threshold comparison table;

in response to the required storage being dedicated to the large object data, matching to one of a plurality of large object variable forms by a data router in accordance with variable names to which the variable values correspond;

storing the variable values by an object storage and outputting the corresponding object-referencing character strings to a PV storage unit; and replacing the corresponding variable values in the PV form with the object-referencing character strings by the PV storage unit.

11. The large object processing method according to claim 10, further comprising:

after the PV processing module organizing the PV form, obtaining a corresponding dataset in the PV form by the PV processing module; and outputting the dataset by the PV processing module.

12. The large object processing method according to claim 10, further comprising:

after the data analyzing unit determining each of the variable values in the PV form, storing the PV form by the PV storage unit.

13. The large object processing method according to claim 10, wherein the PV form comprises the plurality of variable values and the plurality of variable names; wherein each of the variable names corresponds to one of the plurality of variable values; wherein each of the object values is one of the variable value and the object-referencing character string.

14. The large object processing method according to claim 10, further comprising:

establishing the plurality of large object variable forms by the data router in accordance with one of a processing time and a numbering value; and wherein each of the variable name is matched to one of the plurality of large object variable forms via one of Hash function calculating and a numbering value.

15. The large object processing method according to claim 10, further comprising:

matching a plurality of runtime lengths and a plurality of large object thresholds in the large object threshold comparison table by a threshold configurator in accordance with their sizes; wherein the plurality of runtime lengths and the plurality of large object thresholds are negatively correlated and such correlation is displayed in the large object threshold comparison table where they are arranged and matched accordingly; and obtaining the large object threshold comparison table that corresponds to the request for storing by the large object threshold reader according to a user number and an activity execution to which the request for storing corresponds.

16. The large object processing method according to claim 10, wherein detected data are varying business data;

the request for processing corresponding to an activity execution and a data requirement list;

wherein the step of determining whether the plurality of object values comprise the object-referencing character strings by the large object processing module comprises:

determining whether the plurality of object values comprise object-referencing character strings by the large object processing module and determining whether the object-referencing character strings conform to the data requirement list;

wherein the step of replacing the object-referencing character strings in the PV form with the large object data by the PV processing module comprises:

in response to the plurality of object values that comprise the object-referencing character strings, which conform to the data requirement list, replacing the object-referencing character strings that conform to the data requirement list with the large object data by the PV processing module.

17. The large object processing method according to claim 16, further comprising:

matching a median of a historic runtime to one of the plurality of large object thresholds by a threshold configurator in accordance with a length of time; and adding the plurality of runtime lengths and the plurality of large object thresholds into the large object threshold comparison table by the threshold configurator in accordance with the median of the historic runtime to adjust the large object threshold comparison table;

wherein the step of determining whether the required storage space is dedicated to the large object data by the data analyzing unit in accordance with the large object threshold comparison table further comprises:

obtaining corresponding thresholds from the large object threshold comparison table by the data analyzing unit in accordance with a PV runtime.

18. The large object processing method according to claim 17, further comprising:

recording the median of the historic runtime by a statistic unit and outputting the median of the historic runtime to the threshold configurator.

* * * * *